INVENTOR.
Marvin W. Johnson
BY
Paul Fitzpatrick
ATTORNEY

United States Patent Office 3,532,443
Patented Oct. 6, 1970

3,532,443
ENGINE LUBRICATION
Marvin W. Johnson, Speedway, Ind., assignor to General Motors Corporation, Detroit, Mich., a corporation of Delaware
Filed Aug. 30, 1968, Ser. No. 756,580
Int. Cl. F04c 29/02; F02c 7/06; F01m 1/00
U.S. Cl. 417—367
8 Claims

ABSTRACT OF THE DISCLOSURE

A gas turbine engine has main bearings at the forward end of the compressor and at the turbine. A common lubrication system supplies both bearings. This includes a pump mounted adjacent the compressor bearing, a transfer tube structure connecting the pump to the turbine bearing, and jets to direct oil from the pump to both bearings. Oil is returned by stationary scoops mounted within rotating structure adjacent the bearings. The transfer structure includes a heat exchanger by which the oil returning from the turbine bearing is cooled by air bled from a low pressure stage of the compressor and circulated through the tube to a point of discharge downstream of the turbine.

---

My invention is directed to improvements in lubricating systems for engines, particularly gas turbine engines. In its preferred embodiment described herein, my invention provides a simple self-contained lubricating system for the gas generator of a gas turbine lift engine. However, the system, as well as certain features of it, are clearly applicable to other engines.

The principal objects of my invention are to provide a simple, reliable, lightweight, and self-contained lubricating system for a gas turbine engine, one particularly suited to a single shaft gas generator type of engine. Other objects of the invention are to provide improved structure for supplying oil to and returning it from bearings of rapidly rotating machinery, to provide an oil supply system readily contained within the rotating structure of a turbomachine, and to provide oil circulating means including a heat exchanger to cool the oil. A further object is to provide a compact oil circulating and cooling system adapted for installation on the axis of a turbomachine.

The nature of my invention and the advantages thereof will be clear to those skilled in the art from the succeeding detailed description of the preferred embodiment of the invention and the accompanying drawings thereof.

Figure 1:
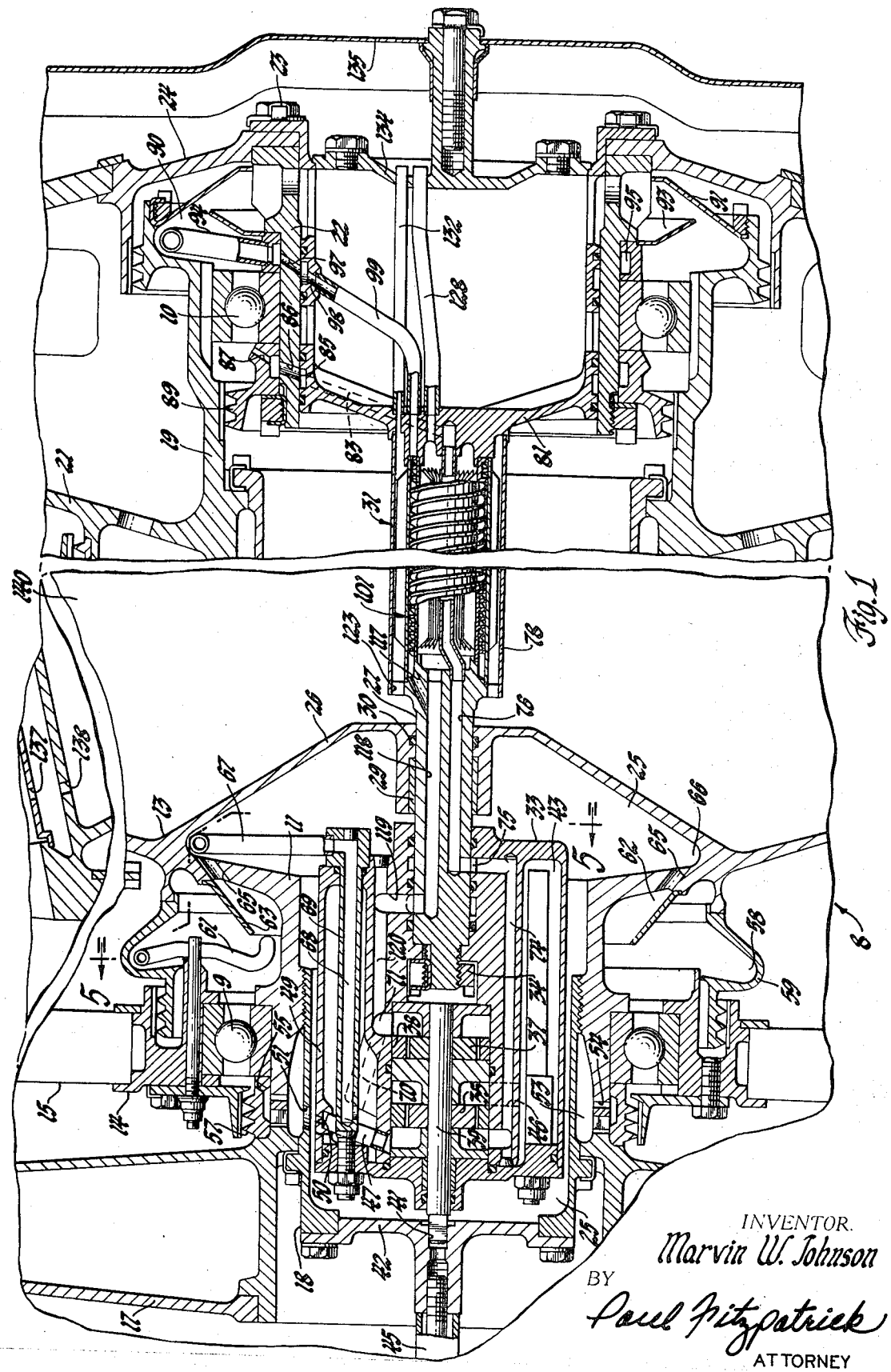
FIG. 1 is a view of a portion of a gas turbine engine or gas generator taken in a plane containing the axis of the engine, illustrating principally the front and rear bearings for the rotor structure of the engine.

Referring first to FIG. 1, this figure shows preferred lubrication structure according to the invention applied to a simple turbojet or gas generator type of engine which, as is well known, embodies as its primary elements a compressor, a combustion apparatus supplied by the compressor, a turbine driven by the motive fluid generated by the combustion apparatus, and shafting connecting the turbine to the compressor to drive the compressor. The hot gas output of such a gas generator may provide a lifting or propulsive jet or may drive other turbines. Since such engines are well known, the structure of the engine as a whole is not illustrated and will not be described in detail. Examples of engines of the type to which reference is made are described in U.S. Pats. No. 3,327,473 of Smith for Engine Support Structure, June 27, 1967, and of Johnson for Aft Fan Jet Engine, No. 3,332,242, July 25, 1967.

The rotors of the turbine and compressor in the illustrated embodiment comprise a single rotating mass or rotor 8 supported by a forward or compressor ball bearing 9 and a rear or turbine ball bearing 10. The beaing 9 is on a stub shaft 11 extending forward from the compressor rotor structure 13. This bearing is mounted in a support 14 suspended from the outer case of the engine (not illustrated) by struts 15. An overhung first rotor stage or fan 17 is splined to stub shaft 11 ahead of bearing 9 and retained by a hollow sleeve or tie bolt 18 which is threaded into the stub shaft.

The rotor rear end stub shaft 19 which extends rearwardly from the turbine wheel or disk 21 is mounted on the outer race of bearing 10. The inner race of this bearing is mounted on a supporting sleeve 22 held by bolts 23 to a ring 24 suitably supported from the outer case of the engine.

A lubricating oil sump 25 is defined within stub shaft 11 and tie bolt 18 and a flange 26 extending toward the rotor axis from the compressor disk 13. A stationary oil tube 27 is supported on the axis of the rotor by a sleeve bearing 29 in flange 26 and is sealed by an O-ring 30. Oil tube 27 is a part of the stationary oil transfer structure 31 to be described. This transfer structure extends to the turbine of the engine where it is nonrotatively supported by the support ring 24. A stationary pump housing 33 fixed to the oil tube 27 by a nut 34 is centrally mounted within the oil sump. A pressure pump 35 and a scavenge pump 37 which are preferably of the well known Gerotor type are mounted within a cavity 38 in the pump housing. These pumps are driven by a common shaft 39, the front end of which is noncircular and is received in a socket 41 in a cover plate 42 which is bolted to the tie bolt and closes the forward end of the oil sump 43. A tie bolt 45 extending forwardly from cover plate 42 holds a rotating fairing (not illustrated) on the front of the compressor defining the inner boundary of the engine air inlet.

The pressure oil pump 35 draws oil from the sump 43 through a passage 46 and discharges part of the oil through a tube or passage 47 which extends to and through the outer shell 49 of the pump housing 33 where it emerges through a jet 50. From this jet the oil flows radially by veloctiy through apertures 51 in tie bolt 18 into an annular space 53 in the interior of stub shaft 11 around the tie bolt. From this reservoir 53 the oil flows by centrifugal force through radial holes 54 in the tie bolt and 55 in a labyrinth seal ring 57 mounted between bearing 9 and fan rotor 17 to the compressor ball bearing 9, from which it flows under the influence of centrifugal force into an annular scavenge reservoir 58 to the rear of the bearing.

Figure 5:
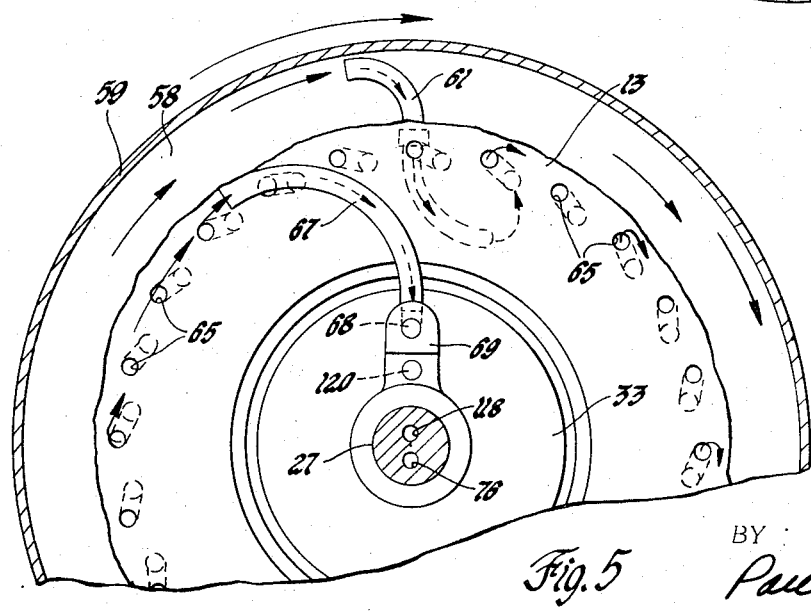
FIG. 5 is a transverse sectional view taken on the broken plane indicated by the line 5—5 in FIG. 1.

Reservoir 58 (see also FIG. 5) is defined within a labyrinth seal ring 59 fixed to the rotor disk 13 which cooperates with the stationary support 14 to inhibit leakage of oil from the reservoir or air into it. The rotating annulus oif oil in the reservoir 58 is rammed into a stationary S-shaped scoop tube 61 bolted to the support 14, which carries the scavenger oil radially inward and discharges it into a pocket 62 defined by the forward face of disk 13 and a conical dam 63. This oil then flows outwardly and rearwardly under the influence of centrifugal force through one of a number of oil transfer holes 65 in disk 13 into the outermost portion 66 of the oil sump 25. The oil is rammed from this rotating annulus into a curved scoop tube 67 which delivers it into an axially extending passage 68 in a bolt 69 which holds the scoop tube on the pump housing 33. Bore 68 communicates through a passage 70 with an inlet 71 to the scavenge pump 37 which pumps it through an outlet (not illustrated) into the sump 43.

The foregoing describes the circulation of oil from the sump through the pressure pump to the compressor bearing and its return through the scoop tubes and scavenge pump to the sump. In this connection the scavenge pump is not absolutely necessary since the scoop tubes can take care of the return. Under some circumstances, however, it is believed that the presence of the scavenge pump to control oil flow is desirable.

Figure 2:
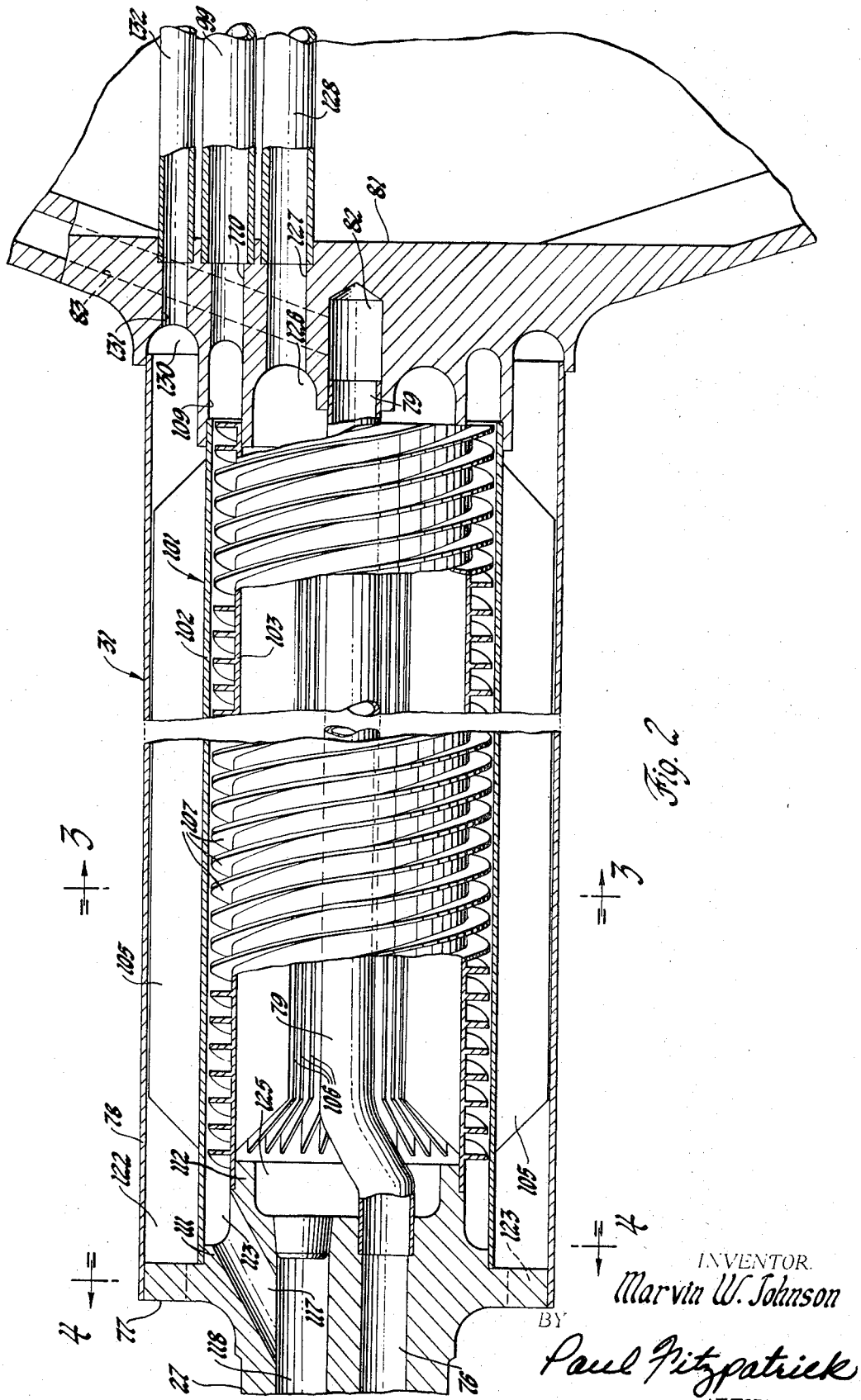
FIG. 2 is an enlarged view of a transfer structure taken on the same plane as FIG. 1 and with parts broken away.
Figure 4:
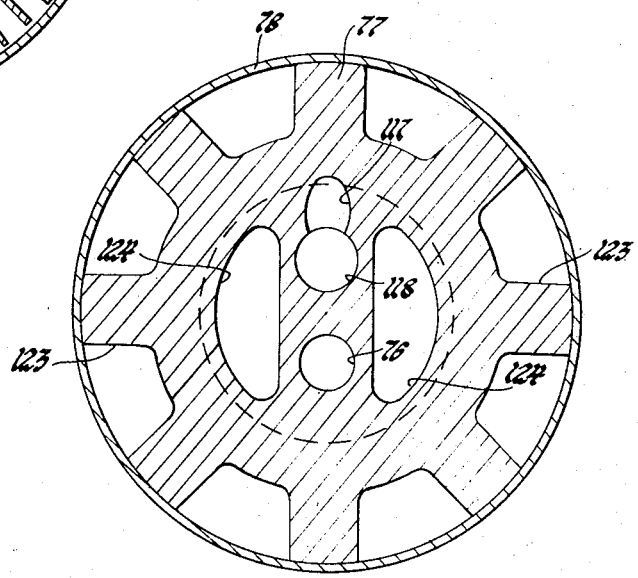
FIG. 4 is a transverse sectional view taken on the plane indicated by the line 4—4 in FIG. 2.

As previously stated, the oil is circulated to and from the turbine bearing 10 through the transfer structure 31 including the oil tube 27 which connects this to the pump housing 33. There is a second outlet from the forward face of the pressure pump 35 into a passage 74 extending rearwardly of the pump housing 33 and communicating through a radial passage and an annulus 75 with a pressure oil conduit 76 extending axially of the oil tube 27. Referring also to FIGS. 2 and 4, the rear end of oil tube 27 includes a flange 77 on which is mounted a thin metal cylinder or lightweight tube 78 which is the outer jacket of the oil transfer structure 31. Passage 76 connects to a pressure oil line 79 which extends through the center of jacket 78 and terminates at a fitting 81 mounted within the bearing support 22.

Fitting 81 is a cup-shaped body which is piloted within the interior of supporting sleeve 22 and has a flange which is retained by bolts 23. Tube 79 may be brazed or otherwise fixed within the rear end of oil tube 27 and a central bore 82 in fitting 81. A radial oil supply bore 83 extends outwardly from bore 82 to carry oil to the bearing 10. Oil supply bore 83 communicates through an annulus 85 in the periphery of fitting 81, radial passages 86 in the supporting sleeve 22 and a further annulus, and radial passages 87 in a labyrinth seal ring 89 bolted in abutting relation to the inner race of bearing 10 with the bearing 10.

This lubricating oil, after flowing through the bearing 10, is retained in a rotating scavenge reservoir 90 defined by the expanded rear end of turbine stub shaft 19 and a sheet metal cone 91 fixed to it. A shield 93 deflects oil splashing rearwardly from the bearing to diminish its tendency to escape between cone 91 and the support 24. A scoop tube 94 having a tangential inlet is fixed to the outer surface of supporting sleeve 22 on an internally recessed ring 95. From this the scavenge oil passes through radial passages 97 in the supporting sleeve 22 and 98 in the fitting 81 into a scavenge oil return tube 99 (see also FIG. 2) which conducts it to the oil transfer structure 31 through the compressor.

Figure 3:
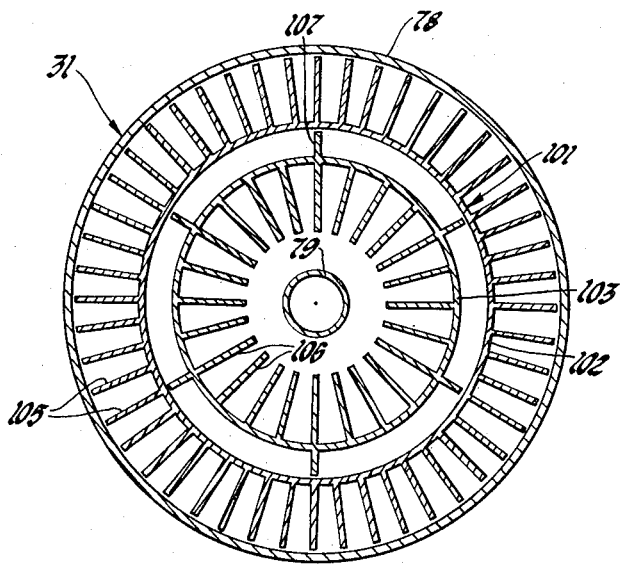
FIG. 3 is a transverse sectional view taken on the plane indicated by the line 3—3 in FIG. 2.

The oil returning from the turbine bearing flows through a heat exchanger in which it is cooled by low pressure air withdrawn from a suitable source such as the engine compressor. Considering now the structure of this radiator or heat exchanger, it is embodied in a scavenge oil return tube and heat exchanger 101 which comprises coaxial outer and inner tubes 102 and 103 respectively, (see also FIG. 3). Outer tube 102 bears a large number of axially extending fins 105 on its outer surface and inner tube 103 bears a number of axially extending fins 106 on its inner surface. The scavenge oil flows between the outer and inner tubes in a number of helical paths, preferably six, divided from each other by six equally spaced helical ribs 107 extending from the inner tube 103 into contact with the outer tube. The oil is thus caused to move with greater velocity through a longer path and thus improve the heat transfer. Ribs 107 also assist in conduction of heat from the oil to the inner tube 103 and thus to fins 106. The rear ends of tubes 102 and 103 are fixed by brazing or otherwise in an annular recess 109 in the forward face of fitting 81 which communicates through a passage 110 with oil return tube 99. The scavenge oil thus follows a helical path through the return tube 101 to the oil tube 27. The rear end of the oil tube 27 has two cylindrical surfaces 111 and 112 to which the forward ends of tubes 102 and 103, respectively, are brazed, and an annular chamber 113 is defined between the outer tube and the oil tube 27. This communicates through a short passage 117 with an axially extending passage 118 in the oil tube 27. Referring to FIG. 1, the forward end of this passage 118 connects through a radial passage 119 in the pump housing with an axial passage 120 which discharges into the scavenge pump inlet 71.

The cooling air for the scavenge oil enters an annular outer passage 122 between jacket 78 and outer tube 102 through a number of cutouts 123 in the flange 77 of the oil tube 27. Air also flows into the rear part of oil tube 27 through two axially extending entrances 124 (FIG. 4) which admit air to a space 125 (FIG. 2) from which it flows rearwardly through the annular space between inner tube 103 and pressure oil tube 79 to an annular recess 126 in the face of fitting 81. From this recess air flows through a passage 127 into a tube 128. The air flowing through passage 127 enters a recess 130 which communicates through passage 131 with a tube 132. Tubes 128 and 132 carry the cooling air through a cover plate 134 on the rear of support sleeve 22. The air thus discharged can flow radially outward between the support 24 and a turbine rear cover plate 135 to the turbine exhaust duct downstream of the turbine wheel (not illustrated). The cooling air is derived from the compressor, preferably through one or more holes 137, 138 (FIG. 1) in the compressor drum at the second stage which allow the air to flow into the space 140 downstream of disk 13 and through openings 123 and 124 into the oil cooler.

It will be noted that the system has been described with a single scoop tube 61, a single scoop tube 67, and a single scoop tube 94, as well as single tubes in other locations. These could be duplicated or multiplied if desired, but ordinarily no such duplication should be necessary.

The operation of the device should be clear to those skilled in the art from the foregoing description but, in brief review, oil within the sump 43 is pumped by pump 35 into annulus 53 from which it flows under centrifugal force to bearing 9, is accumulated in scavenge reservoir 58, picked up by scoop tube 61 and delivered through port 65 to the outer portion 66 of sump 43 from which it is delivered by scoop tube 67 and passages 69 and 70 to scavenge pump 37, thus completing the circuit of the compressor bearing lubricating oil. The oil for the turbine bearing is discharged from the pressure pump through passages 74 and 76, tube 79, and radial passages in the fixed bearing support structure of bearing 10. The scavenge oil is returned from the sump 90 by the stationary scoop tube 94 through tube 99 and the annular oil cooler and passages 118 and 120 to the scavenge pump. Cooling air from the compressor flowing through the annular space outside and inside of the oil return tube 101 in contact with fins 105 and 106 cools the oil which has been heated by exposure to the relatively hot hub of the turbine wheel and the associated hot stationary structure.

It will be apparent to those skilled in the art that devices in accordance with my invention provide an exceptionally simple and reliable structure for lubricating the bearings or a turbine or similar engine. The oil transfer structure 31 is readily put in place in the interior of the rotating structure and is held stationary by the bearing support 25. The compressor rotates around this structure 31 which also holds the pump housing 33 stationary. The pumps are driven through shaft 39 by the rotating compressor structure.

As previously stated, the system is operative without the scavenge pumps, but they are considered to be desirable in some installations and the structure described makes provision for such scavenge pumps, if desired. Of course, it is a simple matter to omit them if they are not required.

The detailed description of the preferred embodiment of the invention for the purpose of explaining the principles thereof is not to be considered as limiting the invention, since many modifications may be made by the exercise of skill in the art.

What is claimed is:

1. A lubrication system for an engine having a rotor and two bearings spaced axially of the rotor supporting the rotor for rotation, the lubrication system including a pump adjacent one said bearing, stationary transfer means substantially coaxial with the rotor extending through the rotor from the pump to the other said bearing, the transfer means defining a supply conduit for supplying oil from the pump to the other said bearing and a return conduit for returning the oil from the other said bearing to the pump, and means for circulating a cooling medium along and through the transfer means in heat exchange relation to the two said conduits.

2. A system as recited in claim 1 including means for extracting air from the engine and supplying it to the said circulating means.

3. A system as defined in claim 1 in which the transfer means defines, in order outward from the axis, an axial oil conduit, an annular cooling medium duct, an annular oil conduit, and an annular cooling medium duct.

4. A system as defined in claim 3 including fins extending from the annular oil duct into the cooling medium ducts.

5. A system as defined in claim 3 in which the annular oil duct includes helical baffles to cause the oil to follow a helical path.

6. A lubrication system for a gas turbine engine having rotor means including coaxial compressor and turbine rotors, a stationary structure, and a compressor bearing and a turbine bearing supporting the rotor means on the stationary structure, the lubrication system including stationary transfer means interconnecting the bearings disposed along the rotor axis, through the rotor means, pumping means adjacent one of said bearings including a part rotated by the rotor means and a part held stationary by the transfer means, means for conducting oil under pressure to the said one bearing and through the transfer means to the other bearing and for returning oil from the said one bearing and from the said other bearing through the transfer means to the pumping means, and means for circulating a cooling medium through the transfer means in heat exchange relation to the oil circulated to the said other bearing.

7. A system as defined in claim 6 including means for bleeding air from the compressor rotor and supplying it to the cooling medium circulating means.

8. A system as defined in claim 7 including means for discharging the said air downstream of the turbine rotor.

References Cited

UNITED STATES PATENTS

| 2,709,567 | 5/1955 | Wood | 253—39.1 |
|---|---|---|---|
| 2,791,091 | 5/1957 | Wheatley et al. | 60—39.66 |
| 2,804,280 | 8/1957 | Wheatley | 253—39.15 |
| 2,866,522 | 12/1958 | Morley et al. | 184—6 |

ROBERT M. WALKER, Primary Examiner

U.S. Cl. X.R.

60—39.08; 184—6; 308—76; 417—372